March 3, 1964　　LA RON O. QUICKSTAD　　3,123,151

TWO-WAY PLOW

Filed June 18, 1962　　　　　　　　　　　3 Sheets-Sheet 1

INVENTOR.
LARON O. QUICKSTAD
BY
Carlsen and Carlsen
ATTORNEYS

March 3, 1964 LA RON O. QUICKSTAD 3,123,151
TWO-WAY PLOW
Filed June 18, 1962 3 Sheets-Sheet 2
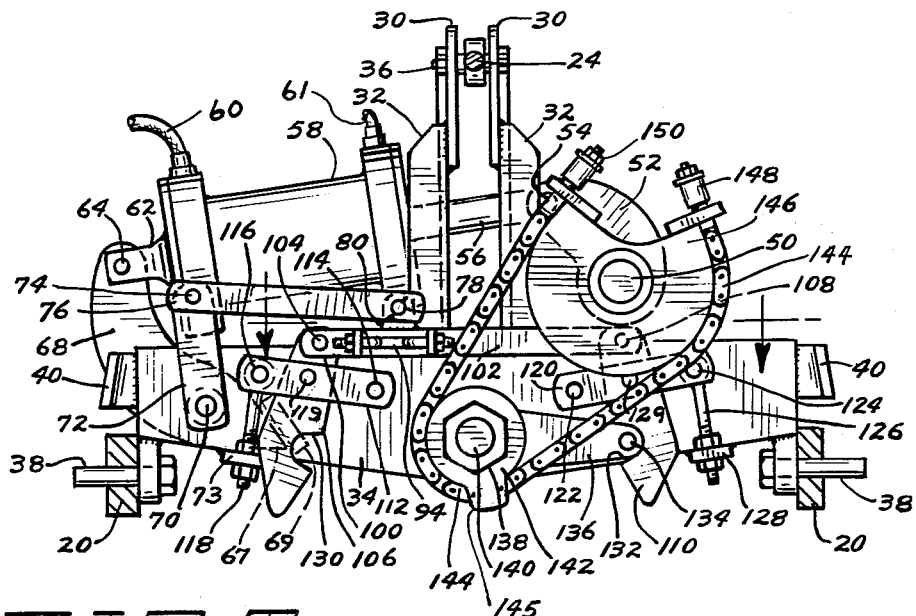
FIG. 2
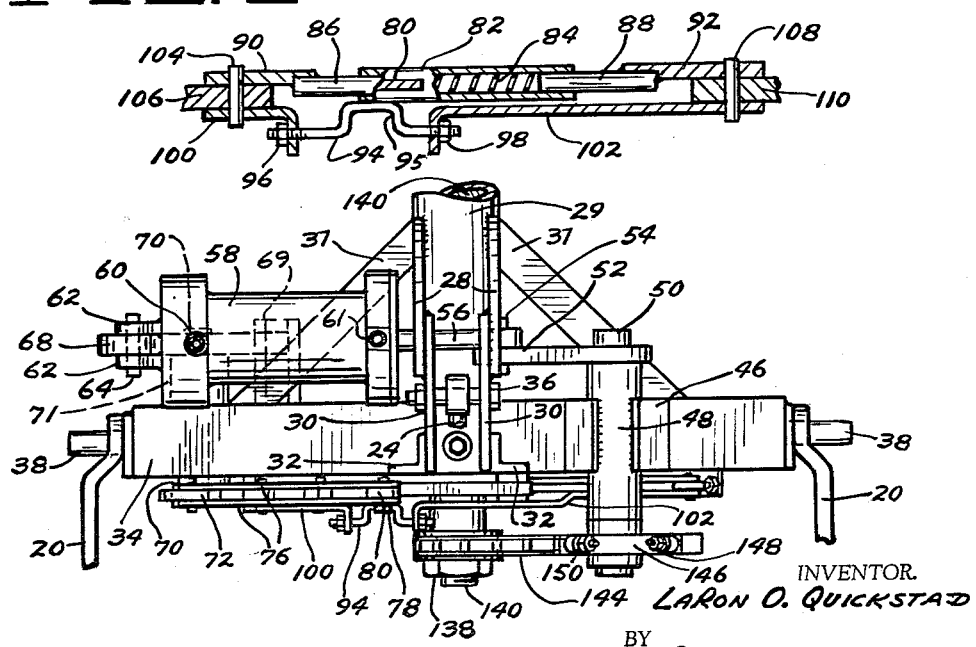
FIG. 3
FIG. 4
INVENTOR.
LARON O. QUICKSTAD
BY
Coulsen and Coulsen
ATTORNEYS

March 3, 1964 LA RON O. QUICKSTAD 3,123,151
TWO-WAY PLOW

Filed June 18, 1962 3 Sheets-Sheet 3

INVENTOR.
LARON O. QUICKSTAD
BY
Coolsen and Carlsen
ATTORNEYS

United States Patent Office 3,123,151
Patented Mar. 3, 1964

3,123,151
TWO-WAY PLOW
La Ron O. Quickstad, Minneapolis, Minn., assignor, by mesne assignments, to Minneapolis-Moline, Inc., Hopkins, Minn., a corporation of Delaware
Filed June 18, 1962, Ser. No. 203,331
5 Claims. (Cl. 172—227)

This invention relates to agricultural implements and more particularly to two-way plows.

A variety of two-way plows have been previously proposed. Some of these prior devices have been relatively complicated in construction and consequently expensive to manufacture. Other implements of this type have been, to some extent, ineffective in operation and subject to excessive wear.

In most prior two-way plows a latch is provided for releasably locking the plow carrying framework in one of two operating positions. These latches, in addition to being complicated in construction, are sometimes subject to failure because springs or other parts occasionally become fouled with foreign material such as dirt. Furthermore, in most latching devices of this type two separate springs are required.

According to prior practice, one or more latch engaging lugs have been provided upon the plow carrying framework of the implement and as a result this framework must be rigidly affixed to a supporting shaft or the like upon which it is mounted.

The angle of attack of the plow and the resulting width of cut have previously been controlled by adjusting the angle or position of a landside mounted upon the rearward plow assembly of each of the upper and lower sets of plow blades. To change the width of cut, it was therefore necessary to make two separate adjustments. According to the present invention, a novel means is provided for adjusting the angle of attack of the entire plow carrying framework. A further disadvantage of many prior two-way plows derives from the fact that only a predetermined and fixed number of plow blades can be employed.

It is thus one object of the present invention to provide an improved two-way plow including a novel latching assembly for releasably securing the plow carrying framework in one of two preselected positions and characterized by the provision of a single latching spring which is entirely enclosed and thereby protected from foreign material.

It is another object of the present invention to provide an improved two-way plow having a main framework, a plow carrying framework pivotally mounted thereon and a latch assembly for releasably securing the plow carrying framework in one of two preselected operating positions and adapted to engage a retaining element positioned forwardly of the main framework.

It is yet another object of the present invention to provide a two-way plow wherein a single adjustment will enable the attack angle of both sets of plow blades to be changed at the same time.

It is a still further object of the present invention to provide an improved two-way plow having plow carrying framework which is adjustably affixed upon a supporting shaft for pivotal movement about a vertical axis whereby the attack angle of the plow blades can be regulated as required.

It is yet another object of the present invention to provide an improved two-way plow wherein the angle of attack of the plow carrying framework can be changed without affecting the operation of a latch used for releasably locking the plow carrying framework in one of two operating positions.

It is yet another object of the present invention to provide an improved two-way plow wherein additional plow blades can be secured thereto as required.

These and other more detailed and specific objects will be disclosed in the course of the following specification, reference being had to the accompanying drawings, in which—

FIG. 2 is a transverse sectional view taken on line 2—2 of FIG. 1 and drawn to an enlarged scale.

FIG. 3 is a transverse sectional view taken on the section line crossed by the vertically directed arrow shafts in FIG. 2 and looking downwardly.

FIG. 4 is a partial plan view of the main supporting framework.

Figure 1:
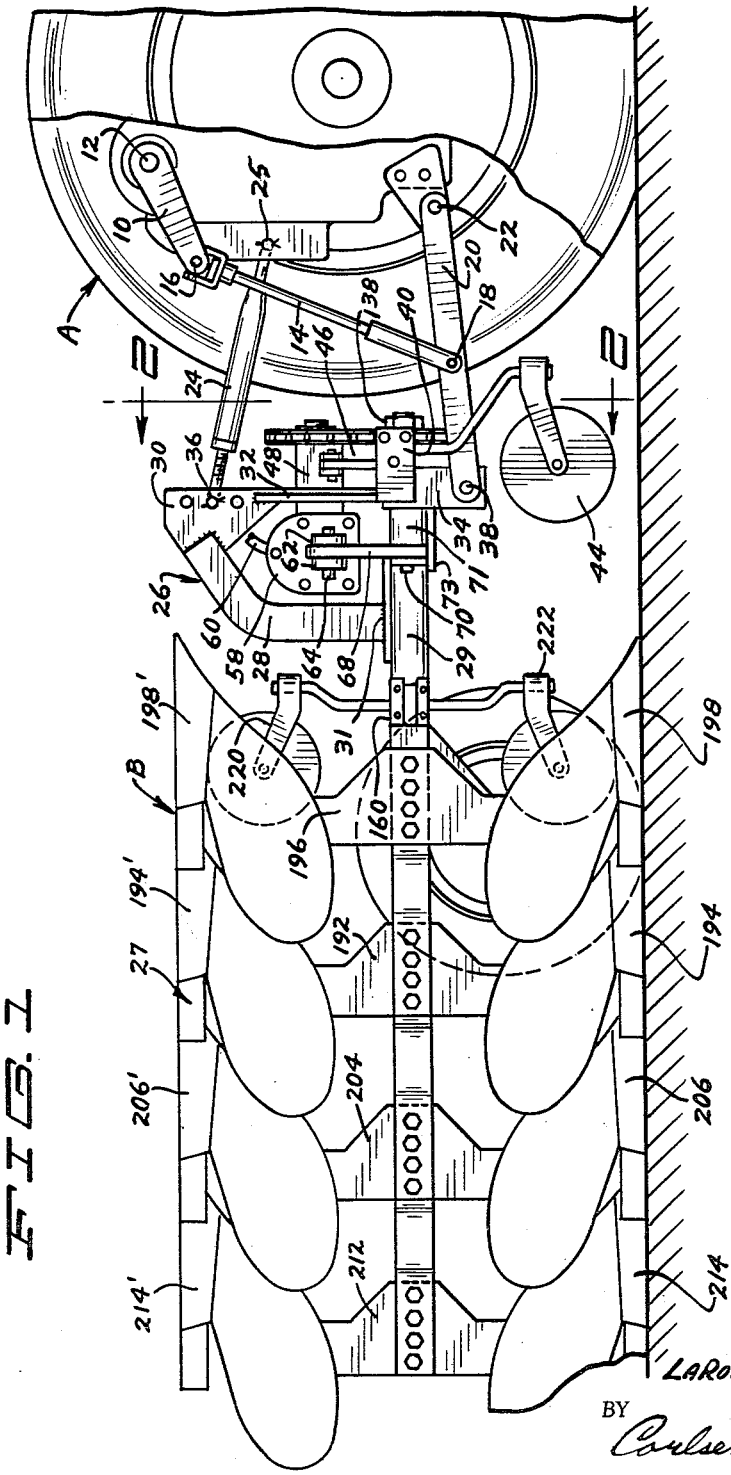
FIG. 1 is a side elevational view of a two-way plow according to the present invention as it appears when mounted upon a tractor.

Referring now to the drawings and particularly to FIG. 1, there is shown a conventional tractor A upon which is supported a two-way plow B according to the present invention.

The tractor A is provided with a conventional implement hitch assembly commonly referred to as a three-point hitch and including a pair of powered lifting cranks 10, each of which is pivotally secured at its forward end to the tractor at 12 and at its rearward end 16 to a link 14. The lower end of each of the links 14 is pivotally secured at 18 to a draw-bar 20. The forward end of each of the bars 20 is pivotally connected by means of a pivot 22 to the tractor A. Only one of each pair of members 10 and 14 is shown in the drawings. The hitch assembly also includes a center link 24 positioned at the transverse mid-line of the tractor A and secured to the tractor by means of pivot 25 positioned above the pivots 22. During operation, the rearward ends of the links 10, 20 and 24 can be swung upwardly or downwardly in a conventional manner to raise or lower an implement secured to the rearward ends thereof.

The two-way plow B includes a main supporting framework 26 and a plow carrying framework 27 mounted upon framework 36 for rotation about a longitudinally extending axis coextensive with the axis of a pivot tube 29 which forms a part of the main supporting framework 26.

The main supporting framework 26 includes a pair of laterally spaced apart frame members 28 which are secured to the sides of the tube 29 at their lower ends and extend upwardly and forwardly therefrom. The upper ends thereof are rigidly secured to a pair of laterally spaced apart hitch members 30. When the implement is attached to the tractor A, the rearward end of link 24 is secured between the members 30 by a suitable pivot pin 36. Extending downwardly from the members 30 are a pair of frame members 32. The lower ends of the members 32 are secured to the upper surface of a cross member 34 which is rigidly attached to the forward end of tube 29. A pair of braces 37 are affixed between the tube 29 and the cross member 34. To attach the implement B to the tractor A, the rearward ends of the drawbars 20 are pivotably secured to the ends of the cross members 34 upon pins 38.

Affixed to the ends of the member 34, above each of pins 38, is a bracket 40 for supporting a coulter 44 of well known construction.

On the upper surface of the member 34 is mounted a support standard 46 to the upper end of which is secured a longitudinally extending tube 48. Within tube 48 is journalled a shaft 50. To the rearward end of shaft 50 is affixed a crank arm 52. The outward end of crank arm 52 is pivotally secured at 54 to the end of an actuator rod 56 of hydraulic actuator 58. A hydraulic pump (not shown) is provided upon the tractor A for supplying hydraulic fluid through either of lines 60 or 61 to the actuator 58. The outward end of the actuator 58 is provided with a pair of spaced apart lugs 62 between which extends a pivot pin 64 for securing the upper end of a crank 68 to the actuator 58. The lower end of the crank 68 is tapered to a point at 67 which as seen in FIG. 2 is prevented from moving upwardly beyond a predetermined position by means of stop 69 rigidly secured to the rearward surface of member 34. The crank 68 is rigidly secured to a shaft 70 which is itself journalled for pivotal movement about a longitudinal axis within a support tube 71 extending rearwardly from and rigidly secured to the cross member 34. A stop member 73 is rigidly secured to the lower surface of cross member 34 for limiting the downward movement of the end 57 of crank 68.

The forward end of shaft 70 has rigidly secured to it an upwardly extending crank arm 72. Pivotally secured at 74 to the upward end of the arm 72 is a transversely extending link 76. The inward end of link 76 is pivotally secured at 78 to a lug 80 extending upwardly from and rigidly secured to a spring holder in the form of a tube 82. Within the tube 82 is loosely mounted a transversely extending resilient member, such as a spring 84 as can be best seen in FIG. 3.

Slidably mounted within the left end of the tube 82 as seen in FIG. 3, is a plunger 86 the inward end of which abuts against the left end of the spring 84. Slidably mounted within the opposite end of the tube 82 and abutting against the right end of the spring 84 as seen in FIG. 3 is a plunger 88. Rigidly secured to the plunger 86 is a link 90 and rigidly secured to the plunger 88 is a link 92. Rigidly secured to the forward surface of tube 82 is a latch actuating member 94 having the form of a rod including a rearwardly displaced portion 95. Screw-threaded onto the ends of the rod 94 are suitable stop members such as nuts 96 and 98. Slidably mounted over the left end of rod 94 as seen in FIG. 3 is a link 100. Slidably mounted over the opposite end of the rod 94 is a rearwardly and outwardly extending link 102. The stop members 96 and 98 function to limit the outward movement of links 100 and 102 respectively with respect to the rod 94.

A pivot pin 104 is connected between the outward ends of links 90 and 100. The upward end of a latch member 106 is pivotally mounted upon the pin 104 between the links 90 and 100. A pivot pin 108 is connected between the outward ends of the links 92 and 102. The upward end of a second latch member 110 is pivotally mounted upon pin 108 between the links 92 and 102.

As can be best seen in FIG. 2, a bracket member 112 is pivotally secured at its inward end to the cross member 34 by means of a pivot pin 114. The outward end of the member 112 is pivotally secured at 116 to the upward end of an adjustment link 118. The lower end of the adjustment link 118 passes through an opening in the forward end of the stop member 73. The pivot pin 116 at the upper end of link 118 can be moved up or down by the provision of a suitable adjustment means at the lower end of link 118 such as a pair of nuts screw-threaded thereon and positioned on either side of the member 73. The latch member 106 is pivotally secured to the mounting bracket 112 by means of a pin 119.

In a similar manner, a transversely extending mounting bracket 120 is pivotally secured at its inward end to the forward face of the cross member 34 by means of a pivot pin 122. The outward end of the mounting bracket 120 is pivotally secured at 124 to the upward end of a generally vertically extending adjustment link 126. The lower end of the adjustment link 126 is suitably adjustably secured to the bracket 128 which is itself rigidly secured to the cross member 34. The adjustable connection between the lower end of the link 126 and the member 128 preferably comprises a pair of nuts screw-threaded upon the lower end of the link 126 and positioned on either side of the bracket 128. The latch member 110 is pivotally secured near its center to the center of the bracket 120 by means of a pivot pin 129.

At the lower end of the latch member 106 and upon the inward aspect thereof is provided a recess 130. A similar recess 132 is provided on the inward aspect of the latch member 110. The recesses 130 and 132 are each positioned to receive, during certain phases of operation, a latch engaging member such as a roller 134 mounted for rotation upon a longitudinally extending axis at the outward end of a lever arm 136. The inward end of the lever arm 136 is rigidly mounted upon the forward end of a plow support shaft 140 journalled within the support tube 29.

A pulley 142 is mounted upon the shaft 140 forwardly of the lever 136 and is secured rigidly thereto by means of a nut 138. A suitable coupling means such as a leaf chain 144 is entrained over the pulley 142 and secured thereto at 145. The pulley 142 is provided with a circumferential recess (not shown) for guiding chain 144. The upward ends of the chain 144 are secured to a pulley 146 which is rigidly mounted upon the forward end of the shaft 50. The ends of the chain 144 are secured by means of suitable resilient fasteners 148 and 150 to the pulley 146 so that the shock exerted upon sprocket chain 144 will not be excessive when the plow carrying framework is rotated.

Figure 5:
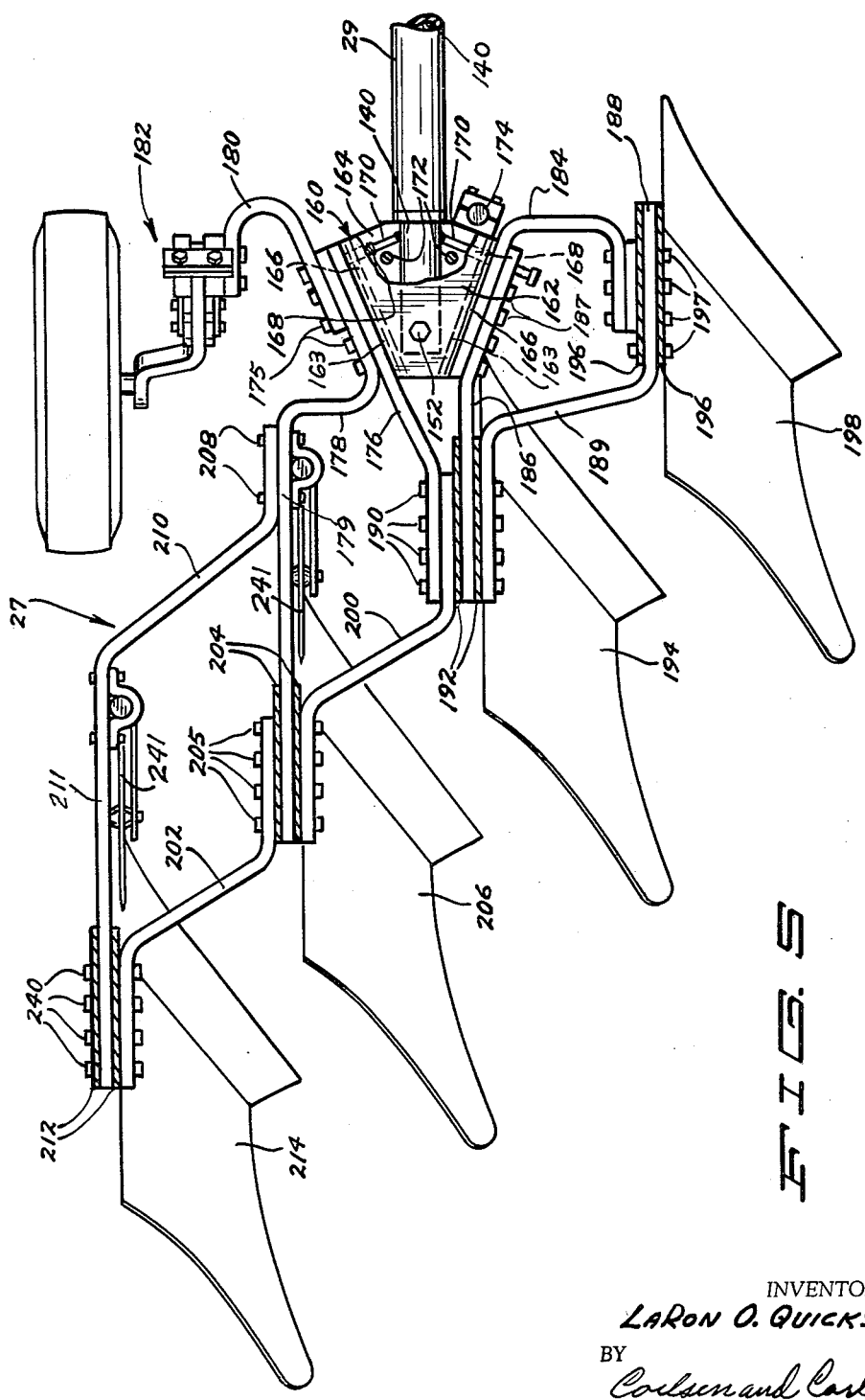
FIG. 5 is a partial plan view of the apparatus showing the plow carrying framework and related parts.

With particular reference to FIG. 5, there is shown a pivot pin in a form of a bolt 152 normally extending vertically through the rearward end of the shaft 140. Pivotally secured upon the rearward end of the shaft 140 by means of the bolt 152 is a bracket or plow frame support head indicated generally at 160. The support head 160 includes a pair of members 162 and 164 formed from flat sheet metal or the like. The members 162 and 164 are positioned parallel to each other at their centers. As seen in FIG. 5, the member 164 includes a pair of upwardly extending side portions 166 positioned in planes inclined centrally toward the rear of the apparatus. The member 162 includes a pair of downwardly extending side portions 163 which are also inclined centrally toward the rear of the apparatus. On the right side of the apparatus as viewed in FIG. 5, the portion 166 is positioned in abutting relationship with the outside of portion 163 of the member 162. On the left side of support head 160 as viewed in FIG. 5, the portion 163 is positioned in abutting relationship with the outward surface of the portion 166.

Projecting centrally from the side portions 163 and 166 and screw-threaded therein are a pair of adjustment bolts 168. The inward ends of the adjustment bolts 168 abut against the outward ends of a pair of lateral extensions 170 which project outwardly from and are secured rigidly at their inward ends to the shaft 140. The upper and lower side edges of the bars 170 as viewed in FIG. 5 are positioned in abutting relationship with the inside surfaces of the members 162 and 164. A pair of locking bolts 172 are positioned on either side of the shaft 140. The bolts 172 fit loosely through the member 162 and are screw-threaded at their opposite ends into the member 164. A mounting bracket, such as bracket 174, can be mounted, if desired, on the forward edge of the support head 160 for supporting a coulter (not shown) of any well known construction.

Rigidly secured to the support head 160, as by means of bolts 175, is a frame member 176 which can be formed from rectangular bar stock. Another frame member 178 is secured to support head 160 outwardly of the member 176 by suitable fasteners such as bolts 175. The frame member 178 bends outwardly at the rearward end of the support head 160 and then bends rearwardly at 179. A frame member 180 is also secured to the supporting head 160 by the bolts 175. The outward end of the member 180 is bent forwardly and has secured thereto a gauge wheel assembly indicated generally at 182.

Extending forwardly and then rearwardly from the right side of the support head 160 as seen in FIGURE 5 is a frame member 184. Another frame member 186 is secured to supporting head 160 against the outer surface of frame member 184 and extends rearwardly therefrom. Frame members 184 and 186 can be secured to the support head 160 by suitable fasteners such as bolts 187.

A frame member 188 is suitably secured to the outward surface of the frame member 184 and extends inwardly and then rearwardly at 189. The rearward ends of the members 176, 186 and 188 are secured together by bolts 190. A pair of vertically extending parallel plow mounting plates 192 are secured upon opposite sides of the rearward end of the frame member 186. To the lower end of the plates 192 is secured a right hand plow assembly 194, and to the upper ends thereof is secured a left hand plow assembly 194'.

Secured upon opposite sides of the forward end of frame member 188 is another pair of plow mounting plates 196. To the lower ends of the plates 196 is secured a right hand plow assembly 198 and to the upward ends thereof is secured a left hand plow assembly 198'. Secured between the frame member 176 and the plate 192 is a frame member 200 which extends rearwardly therefrom and toward the left hand side of the apparatus as viewed in FIG. 5. Suitably secured to the rearward end of the frame member 200 is a frame member 202 and on opposite sides of the rearward end of the frame member 178 between the members 202 and 200 are a pair of vertically extending plow support plates 204. The frame members 178, 200 and 202 are secured together by means of bolts 205. Secured to the lower end of support plates 204, as seen in FIG. 1 is a right hand plow assembly 206 and secured to the upper end thereof is a left hand plow assembly 206'. Secured to the center of frame member 178 by means of bolts 208 is a frame member 210 which extends outwardly and rearwardly therefrom at 211. Secured upon either side of the rearward end of the frame member 210 are a pair of laterally spaced apart vertically extending plow support plates 212. To the lower end of the plates 212 is secured a right hand plow assembly 214 and to the upward ends thereof is secured a left hand plow assembly 214'. The rearward ends of the frame members 210 and 202 and the support plates 212 can be suitably secured together by bolts 240. Coulters 241 of any suitable known construction can be secured to the plow carrying framework 27 as desired.

Operation

When it is desired to place the implement B in position upon the tractor A, the pins 36, and 38 are suitably secured to the rearward ends of the hitch links 24 and 20 respectively. The implement B is then elevated conventionally by raising the lifting levers 10. When the plow B has been thus lifted above the ground, it can be transported to the location desired for operation. The links 20 and 24 can then be lowered and the plowing operation begun.

When the end of the field has been reached, the plow B is again elevated. The actuator 58 is then operated by causing hydraulic fluid to flow therein through line 60. As hydraulic fluid is admitted through the line 60, the actuator rod 56 will be extended thereby producing a torque in a clockwise direction upon the shaft 50 as viewed in FIG. 2. The lever 136, however, will be at first retained within the recess 132 of the latch member 110 thereby resisting the force transmitted from shaft 50 through pulley 146, chain 144 and pulley 142. The extensions of the actuator 58 will, however, produce the torque in a counterclockwise direction on the shaft 70 through the crank 68 and this movement of the shaft 70 will cause the upward end of the arm 72 to swing outwardly thereby moving the tubular member 82 and the connecting member 94 toward the left as seen in FIGS. 2, 3 and 4. The nut 98 at the right end of the latch actuator member 94, as seen in the figures, will cause the link 102 and the upward end of latch 110 to move toward the left as seen in FIG. 2 thereby releasing the roller 134 from the recess 132. The continued movement of the connecting member 56 toward the right, as seen in FIG. 2, will cause the crank 52 and pulley 146 to turn in a clockwise direction and this movement will be transmitted through the chain 144 to the pulley 142 and shaft 140.

As the shaft 140 turns in a clockwise direction as seen in FIG. 2 the plow carrying framework 27 will, of course, rotate on a longitudinally extending axis thereby causing the left hand plow assemblies 198', 194', 206' and 214' to swing downwardly to the operating position. As the roller 134 comes in contact with the latch member 106, the latter will be pivoted in a clockwise direction as seen in FIG. 2 against the compression of spring 84 until the roller 134 is positioned within the recess 130. The spring 84 then will cause latch member 106 to pivot in a counterclockwise direction as seen in FIG. 2 with the recess 130 engaging the roller 134. It will be understood that the lower end of each of the latch members 106 and 110 will be yieldably biased inwardly by the spring 84.

When it is desired to return the plow carrying framework to its original position, fluid is passed into the actuator 58 through line 61 and the actuator member 56 is retracted into the actuator 58. When the rod 56 begins to move, the crank 68 will turn in a clockwise direction, as seen in FIG. 2, thereby moving the upward end of arm 72, link 74 and the tubular member 82 toward the right as seen in FIGS. 2, 3 and 4. As these members move toward the right, the rod 94 will also move to the right until stop 96 causes the link 100 and the upward end of the latch 106 to swing toward the right as seen in the figures and thereby release the roller 134 from the recess 130. Continued inward movement of the actuator rod 56 will cause the crank 52, shaft 50 and sprocket 146 to turn in a counterclockwise direction as seen in FIG. 2. Chain 144 will in turn cause the pulley 142 and shaft 140 to turn in a clockwise direction through approximately 180 degrees until the roller 134 again contacts the lower end of the latch 110. The lower end of the latch 110 will then swing outwardly while compressing the spring 84 until the roller 134 is returned to its original position within the recess 132. With the plow carrying framework 27 in its original position, plow assemblies 194, 198, 206 and 214 are again ready for operation.

As the plow carrying framework 27 is being turned over, the gauge wheel of the gauge wheel assembly will automatically be shifted between and releasably locked in one of two predetermined selected positions. In each position the gauge wheel assembly 182 will determine the proper depth of the plow blades which are then in use.

Under changing conditions of operation it will be necessary for the operator to adjust the angle of attack of the plow blades and the resulting width of cut. According to my invention, this is accomplished by turning the entire plow carrying framework 27 to the desired angle with respect to the support shaft 140. This is accomplished by pivoting the support head 160 about the center of the pivot bolt 152. Thus, to move the rearward end of the plow carrying framework 27 toward the right hand side of the apparatus, as seen in FIG. 5, the adjustment bolt 186 on the left hand side of the support head is loosened and the adjustment bolt 186 at the right hand side of the support head 160 is tightened by a corresponding amount. The force exerted upon the bar 170 by the latter will pivot the support head 160 and the entire plow carrying framework 27 in a counterclockwise direction about the pivot bolt 152 as seen in FIG. 5. It will be understood that by thus adjusting the right hand plow assemblies 194, 198, 206 and 214, the left hand plow assemblies 194', 198', 206' and 214' will also be adjusted and that the angle of attack of each of the left hand and right hand plow bolts will be substantially identical. It is thus only necessary to make a single adjustment to change the angle of attack and the resulting width of cut for both sets of plow blades.

It will be understood that by employing the improved plow carrying framework disclosed herein, additional sets of plow assemblies can be readily added to the apparatus illustrated. For example, the bolts 249 at the rearward end of the frame member 210 and the bolts at the forward end of the portion 211 can be removed and additional frame member similar to members 210 and 202 can be secured to the left side of member 210 as seen in FIG. 5. These members can be used to support additional left and right hand plow assemblies similar to the assemblies 214 and 214'.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A two-way plow comprising in combination; a main supporting framework adapted to be connected for support from a vehicle, a plow carrying framework positioned rearwardly of said supporting framework and pivotally mounted thereon for rotation about a longitudinally extending axis, left and right hand plow assemblies mounted on opposite sides of said plow carrying framework, an operating means operatively connected to said plow carrying framework for rotating said framework about said axis with respect to said supporting framework between two positions substantially 180 degrees apart about said axis, a latch means operatively connected between said plow carrying framework and said supporting framework for releasably locking said plow carrying framework in each of said two positions and said latch means including a pair of latch members pivotally mounted upon said main support framework, a latch engaging member rigidly connected to the forward end of said elongate member, each of said latch members including portions adapted to engage latch engaging member, a resilient member operatively connected between said latch members to yieldably bias said portions into engagement with said latch engaging member, and a latch operating assembly operatively connected between said operating means and each of said latch members for moving the latch member which is then engaged toward the disengaged position against the compression of said resilient means as a torque is exerted by said operating means upon said elongate member.

2. The apparatus according to claim 1 in which said assembly comprises a tubular member enclosing said resilient means, an elongate member rigidly connected to said tubular member, a stop member at each end of said elongate member and a pair of members pivotally connected at their outward ends to the latch members and slidably mounted over the end of said elongate member adjacent the ends of and the stop members being positioned outwardly of the inward ends of said connecting members.

3. A two-way plow comprising in combination; a main supporting framework, a longitudinally extending elongate member journalled upon said main supporting framework; a motive power means mounted upon said main supporting framework and operatively connected to said elongate member for rotating said elongate member with respect to said supporting framework; a support head pivotally mounted at the rearward end of said elongate member for movement about a normally vertically extending axis perpendicular to the axis of said elongate member; a plow carrying framework secured to said support head and extending rearwardly therefrom; left and right hand plow assemblies mounted upon opposite sides of said plow carrying framework and a latch mechanism for releasably locking said elongate member in either one of two preselected positions substantially 180 degrees apart about said longitudinally extending axis, said latch mechanism including a pair of laterally spaced apart latch members pivotally mounted upon the forward end of said main supporting framework, connecting members pivotally secured to each of said latch members, a member operatively associated with each of said connecting members and adapted to pivot each of said connecting members and the associated latch member only toward a disengaged position, a resilient member operatively connected between said latch members for yieldably biasing each of said latch members toward the latch position and a linkage means operatively connected between said member and said motive power means for moving said member in one direction in response to the movement of said motive power means in a direction adapted to rotate said elongate member one way and for moving said member in the opposite direction responsive to the movement of said motive power means in a direction adapted to rotate the elongate member in the opposite direction, and a lever means extending radially from said elongate member at the forward end thereof and adapted to selectively engage each of said latch members.

4. A two-way plow comprising in combination; a main supporting framework, a longitudinally extending elongate member journalled upon said main supporting framework, a motive power means mounted upon said main supporting framework and operatively connected to said elongate member for rotating said elongate member with respect to said supporting framework, a support head pivotally mounted at the rearward end of said elongate member for movement about a normally vertically extending axis perpendicular to the axis of said elongate member, a plow carrying framework secured to said support head and extending rearwardly therefrom, left and right hand plow assemblies mounted upon opposite sides of said plow carrying framework and a latch mechanism for releasably locking said elongate member in either one of two preselected positions substantially 180 degrees apart about said longitudinally extending axis, said latch mechanism including a pair of laterally spaced apart latch members pivotally secured upon the forward end of said main supporting framework for rotation about longitudinally extending axes, each of said latch members including a latch recess at the lower end thereof and upon the inward aspect thereof, a first connecting member secured by means of a first pivot to the upward end of one of said latch members and extending centrally therefrom, a second connecting member secured by means of a second pivot to the upward end of the other latch member and extending centrally therefrom, a generally tubular spring holding element, a spring mounted within said element, a plunger slidably mounted in each end of said tubular element and engaging the ends of said spring, means connecting each said plunger with said first and second pivots, a latch actuating member rigidly secured to said tubular member and positioned transversely of said apparatus, the inward ends of said connecting members being slidably mounted over said latch actuating member, stop means at each end of said latch actuating member to prevent outward movement of each of said connecting members beyond a predetermined position with respect to said actuating member, a crank arm operatively connected to said motive power means, a link pivotally connected between the end of said crank arm and said tubular member for moving said tubular member and said actuating member in a first direction responsive to the movement of said motive power means in a first direction and in the opposite direction responsive to a movement of said motive power means in the opposite direction and a latch engaging member rigidly secured to the forward end of said elongate member and adapted to selectively engage each of said latch members.

5. In apparatus according to claim 4 in which pivotal connecting between each of said latch members and said main supporting framework is vertically adjustable.

References Cited in the file of this patent

UNITED STATES PATENTS

| | | |
|---|---|---|
| 2,304,383 | Strandlund | Dec. 8, 1942 |
| 2,666,376 | Pursche | Jan. 19, 1954 |
| 2,698,563 | Edwards | Jan. 4, 1955 |
| 2,845,014 | Pursche | July 29, 1958 |